United States Patent
Yetukuri et al.

(10) Patent No.: US 11,338,755 B2
(45) Date of Patent: May 24, 2022

(54) ENERGY ABSORBING FEATURE FOR SEATBACK

(71) Applicant: LEAR CORPORATION, Southfield, MI (US)

(72) Inventors: Arjun Yetukuri, Rochester Hills, MI (US); Jianmin Zhang, Rochester Hills, MI (US); Constantin Florea, Canton, MI (US); Mladen Humer, West Bloomfield, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 17/036,567

(22) Filed: Sep. 29, 2020

(65) Prior Publication Data
US 2022/0097640 A1    Mar. 31, 2022

(51) Int. Cl.
*B60R 21/055*    (2006.01)
*B60R 21/02*    (2006.01)

(52) U.S. Cl.
CPC .... *B60R 21/055* (2013.01); *B60R 2021/0273* (2013.01)

(58) Field of Classification Search
CPC .......... B60R 21/055; B60R 2021/0273; B60R 21/02; B60R 21/026; B60R 2021/0266; B60R 2021/022; B60R 5/04; B60N 2/42; B60N 2/427; B60N 2/503
See application file for complete search history.

(56) References Cited

U.S. PATENT DOCUMENTS

| | | | | |
|---|---|---|---|---|
| 3,334,941 A | * | 8/1967 | Krasinski | B60N 2/36 296/66 |
| 5,344,184 A | * | 9/1994 | Keeler | B60R 21/045 280/730.1 |
| 5,738,368 A | * | 4/1998 | Hammond | B60N 2/68 280/730.1 |
| 6,076,852 A | * | 6/2000 | Faigle | B60R 21/26 280/735 |

(Continued)

FOREIGN PATENT DOCUMENTS

| | | | |
|---|---|---|---|
| DE | 102007017998 A1 | * 10/2008 | ........... B60R 21/207 |
| DE | 102011117938 A1 | * 5/2013 | ........... B60R 21/207 |

(Continued)

OTHER PUBLICATIONS

Machine Translation of DE-102011117938-A1 (Year: 2013).*

*Primary Examiner* — Paul N Dickson
*Assistant Examiner* — Kurtis Nielson
(74) *Attorney, Agent, or Firm* — Brooks Kushman P.C.

(57) ABSTRACT

A seat includes a seat bottom having an occupant support surface, a seatback connected to the seat bottom, the seatback having an occupant support side cooperating with the occupant support surface, and a rear side, and an energy absorbing feature including a rigid member connected to the rear side of the seatback. The rigid member is movable between a storage position adjacent the seatback, and a deployed position extending into a cargo space of a vehicle upon detection or occurrence of an impact event. In the deployed position, the rigid member is capable of interfacing with cargo, a cargo floor, or both, to reduce force imparted on and deflection of the seatback and deflect cargo from impacting the seatback.

18 Claims, 6 Drawing Sheets

(56) References Cited

U.S. PATENT DOCUMENTS

| | | | |
|---|---|---|---|
| 6,092,704 A * | 7/2000 | Baumeister | B60R 5/04 |
| | | | 224/275 |
| 6,336,670 B1 * | 1/2002 | Sav.ang.s | B60N 2/3013 |
| | | | 296/24.43 |
| 7,073,836 B2 * | 7/2006 | Haspel | B60R 7/02 |
| | | | 296/37.1 |
| 8,801,073 B1 | 8/2014 | Gray, Jr. et al. | |
| 10,214,132 B2 | 2/2019 | Wang et al. | |
| 2005/0098996 A1 * | 5/2005 | Enders | B60R 21/2165 |
| | | | 280/751 |
| 2007/0013201 A1 * | 1/2007 | Wagner | B60N 2/36 |
| | | | 296/24.43 |
| 2017/0015249 A1 * | 1/2017 | Dyle | B60R 21/026 |
| 2018/0319345 A1 * | 11/2018 | Fleischhacker | B60R 21/06 |
| 2019/0176710 A1 * | 6/2019 | Loveday | B60R 5/003 |
| 2020/0108745 A1 * | 4/2020 | Hori | B60N 2/206 |

FOREIGN PATENT DOCUMENTS

| | | | | |
|---|---|---|---|---|
| EP | 1514739 A1 | | 3/2005 | |
| FR | 2765536 A1 | | 1/1999 | |
| FR | 2792894 A1 | | 11/2000 | |
| FR | 2860200 A1 * | | 4/2005 | B60R 21/026 |
| FR | 2878209 A1 * | | 5/2006 | B60R 21/026 |
| FR | 2918942 A1 | | 1/2009 | |
| KR | 20030013966 A * | | 2/2003 | |
| KR | 20030086791 A * | | 11/2003 | |
| KR | 100435890 B1 * | | 6/2004 | |
| WO | WO-2011125854 A1 * | | 10/2011 | B60N 2/433 |

\* cited by examiner

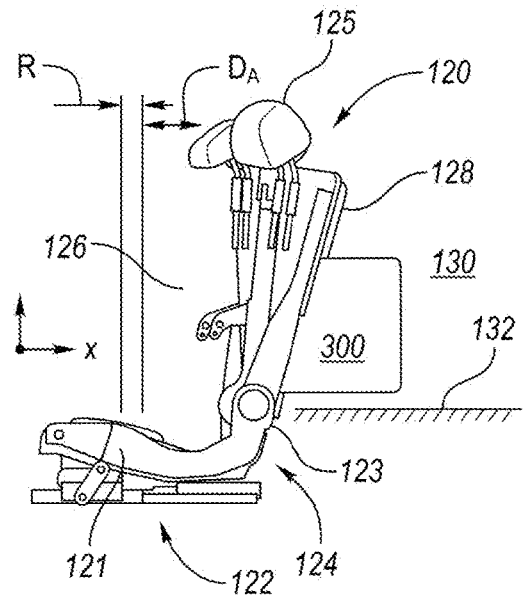
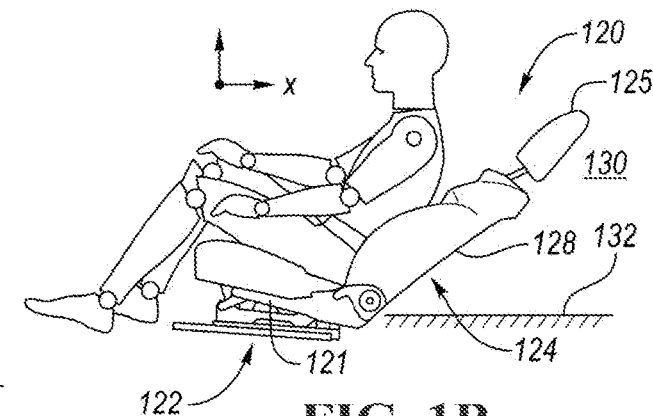
FIG. 1A (PRIOR ART)
FIG. 1B (PRIOR ART)
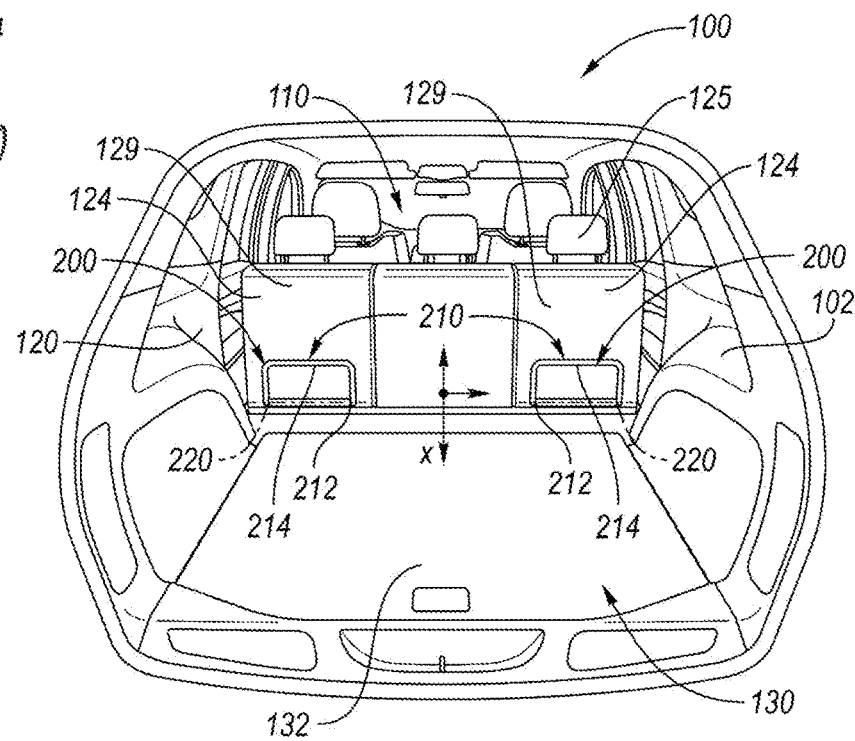
FIG. 2
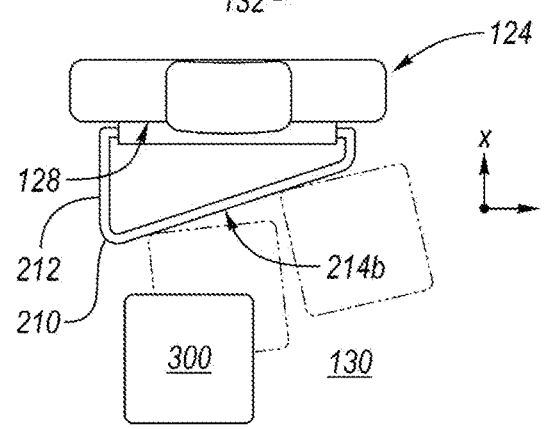
FIG. 3

ENERGY ABSORBING FEATURE FOR SEATBACK

TECHNICAL FIELD

The present application is directed to a feature to interface with cargo and reduce deflection of the seatback, and more particularly, an energy absorbing and/or deflecting feature to interface with cargo or the cargo floor during impact.

BACKGROUND

Vehicles typically include a cargo space at the rear of the vehicle, behind the rear seats. Certain vehicles, such as sport utility vehicles (SUVs), hatchbacks, mini-vans, and vans, offer more convenient cargo spaces by having flat loading floors and larger volume capacities for cargo. Objects placed in the cargo space are generally free to move or slide around within the cargo space, and are not restrained and/or secured except for the vehicle body and rear seatbacks defining the cargo space. However, because the seatbacks of the rear seats are exposed to the cargo space, and therefore to the cargo, the seatbacks may be impacted by unrestrained cargo during impact or sudden braking. Unrestrained cargo during impact or braking may impart energy to the seatback, as shown in FIG. 1A, potentially twisting or deforming the seatback frame or transferring the resulting force to a vehicle occupant. Similarly, during impacts such as rear impact, the rear seatback has potential of deflecting and contacting the rear seat occupant, as shown in FIG. 1B.

SUMMARY

According to one or more embodiments, a seat includes a seat bottom having an occupant support surface, a seatback connected to the seat bottom, the seatback having an occupant support side cooperating with the occupant support surface, and a rear side, and an energy absorbing feature including a rigid member connected to the rear side of the seatback. The rigid member is movable between a storage position adjacent the seatback, and a deployed position extending into a cargo space of a vehicle upon detection or occurrence of an impact event. In the deployed position, the rigid member is capable of interfacing with cargo, a cargo floor, or both, to reduce force imparted on and deflection of the seatback and deflect cargo from impacting the seatback.

According to at least one embodiment, the rigid member may be biased in the deployed position, and the rigid member may be released from the storage position by an actuator upon the detection or occurrence of an impact event. In at least one embodiment, the energy absorbing feature may further include a bladder compressed between a seatback frame and the rigid member when the rigid member is in the storage position, and, in the deployed position, the bladder may be filled with a medium such that the rigid member may be pushed to extend into the cargo space. In certain embodiments, the medium may be a fluid or air provided by an external source, and the bladder may be vacuum sealed in the storage position such that upon the detection or occurrence of an impact event, a valve may open to fill the bladder with the medium. In other embodiments, the medium may be an expandable foam stored in the bladder, and upon the detection or occurrence of an impact event, a valve may open to vent the expandable foam to atmospheric pressure such that the expandable foam may enlarge the bladder. In one or more embodiments, the rigid member may be connected to the seatback at a pivot point such that, in the deployed position, the rigid member may absorb kinetic energy from the cargo by pivoting about the pivot point. In at least one embodiment, in the deployed position, a portion of the rigid member may be positioned at an angle of 35 to 110 degrees from a plane defined along the rear side of the seatback. According to at least one embodiment, the impact event may be a crash event, a predicted crash event, or a sudden braking event.

According to one or more embodiments, a vehicle includes a body having a front end and a rear end, and defining a cargo space having a cargo floor within the body of the vehicle, and a seat within the body forward of the cargo space. The seat includes a seat bottom and a seatback connected to the seat bottom, the seatback having an occupant support side and a rear side exposed to the cargo space. The vehicle further includes an energy absorbing feature connected to the rear side of the seatback, the energy absorbing feature having a rigid member being connected at a pivot and having a free region opposite the pivot. The rigid member is movable about the pivot between a storage position with the free region adjacent the rear side and a deployed position with the free region extending into the cargo space to interface with cargo, the cargo floor, or both, to protect the seatback.

According to at least one embodiment, the rigid member may be U-shaped. In at least one embodiment, the energy absorbing feature may further include a bladder compressed between a seatback frame and the rigid member when the rigid member is in the storage position, and, in the deployed position, the bladder may be filled with a medium such that the rigid member is pushed to extend into the cargo space. In one or more embodiments, the rigid member may be a panel. In certain embodiments, the rigid member may include a plurality of rigid members connected to the rear side of the seatback. In further embodiments, when in the deployed position, a first rigid member of the plurality of rigid members and a second rigid member of the plurality of rigid members may be substantially parallel with the cargo floor, and the pivot of the first rigid member may be spaced apart along a height of the rear side from the pivot of the second rigid member. In at least one embodiment, the rigid member may have an asymmetric shape for deflecting the cargo from impacting the seatback.

According to one or more embodiments, a method of protecting a seatback includes providing a seat having a seat bottom and seatback forward of a cargo space of a vehicle, with the seatback having an occupant support side and a rear side exposed to the cargo space, and the seat including an energy absorbing feature connected to the rear side of the seatback and pivotable from a storage position to a deployed position, and detecting whether a crash event is predicted. The method further includes, upon prediction of the crash event, deploying the energy absorbing feature such that the energy absorbing feature inhibits cargo from contacting the seatback when the energy absorbing feature is in the deployed position.

According to at least one embodiment, the method may further include determining whether the crash event occurred. In certain embodiments, upon determination that the crash event occurred, the method may include deploying the energy absorbing feature such that cargo contacts the energy absorbing feature instead of the seatback. In at least one embodiment, upon determination that the crash event did not occur, the method may further include retracting the energy absorbing feature to the storage position. In at least one embodiment, the energy absorbing feature may include a rigid member having a connection portion at the rear side and a free portion positioned adjacent the rear side of the seatback in the storage position, and positioned in the deployed position at a 35 to 110 degree angle with respect to a plane defined along the rear side of the seatback.

BRIEF DESCRIPTION OF THE DRAWINGS

FIGS. 1A-B are side views of conventional seatbacks during crash events;

FIG. 2 is a partial schematic illustration of a vehicle cargo space, according to an embodiment;

FIG. 3 is a top schematic view of a vehicle seatback with an energy absorbing feature according to another embodiment;

DETAILED DESCRIPTION

Figure 4A:
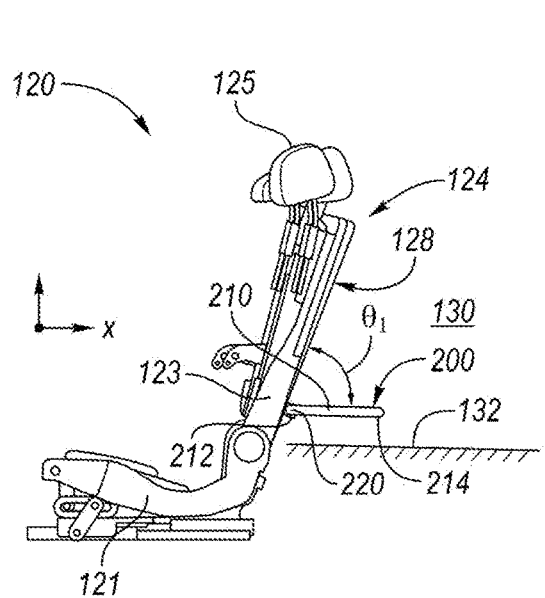
FIGS. 4A-B are schematic side views of a seatback with an energy absorbing feature, according to the embodiment of FIG. 2.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this description and in the claims are to be understood as modified by the word "about" in describing the broader scope of this invention. The term "substantially," "generally," or "about" may be used herein and may modify a value or relative characteristic disclosed or claimed. In such instances, "substantially," "generally," or "about" may signify that the value or relative characteristic it modifies is within ±0%, 0.1%, 0.5%, 1%, 2%, 3%, 4%, 5% or 10% of the value or relative characteristic. Practice within the numerical limits stated is generally preferred. Also, unless expressly stated to the contrary, the description of a group or class of materials by suitable or preferred for a given purpose in connection with the invention implies that mixtures of any two or more members of the group or class may be equally suitable or preferred.

According to one or more embodiments, an energy absorbing feature for protecting the rear side of vehicle seatbacks is provided. The energy absorbing feature is connected to the rear side of the seatback and interfaces with and/or deflects moving cargo during or before a crash event, such as, but not limited to, a rear impact, front impact, rebound phase of a front impact, or sudden braking event. The energy absorbing feature protects the seatback from deflecting due to cargo hitting the seatback, as well as protects rear occupants from having the force of the cargo transferred during sudden braking, rebound, or front impact events, as conventionally shown in FIG. 1A. In certain embodiments, the energy absorbing feature further supports the seatback to reduce seatback deflection in rear impact events, the rear impact deflection being conventionally shown in FIG. 1B.

Referring to FIG. 2, a schematic illustration of a vehicle 100 is provided, according to an embodiment. Vehicle 100 includes a body 102 (e.g., walls, floor, and roof) defining an interior space with front seats 110 and rear seats 120, as placed along a length of the vehicle body defined along axis X with the front end of the vehicle corresponding to the driver end. The vehicle 100 also includes a cargo space 130 located at the rear end of the vehicle, defined by a cargo floor 132, the rear seats 120, and the vehicle body 102. Although only one row of rear seats 120 is shown in FIG. 2, the vehicle 100 may include any suitable number of additional rows in the rear of the vehicle. Regardless of the number of seating rows, the rearmost seating row has seatbacks exposed to the cargo space 130 at the rear of the vehicle. Although a sport utility vehicle (SUV) is shown in FIG. 2, the vehicle may be any suitable vehicle with a rear side of the rear seatbacks being exposed to the cargo space, such as, but not limited to, hatchbacks, mini-vans, cargo vans, and the like. Furthermore, it should be understood that the principles of the present disclosure are applicable to other types of seat assemblies, and although a bench configuration is shown for rear seats 120, bucket, captain, or other suitable seats are also contemplated. It further should be understood that although the features are discussed with respect to rear seats 120 and the cargo space 130, the present embodiments also apply to any vehicle seats that may interface with cargo stored in any space of the vehicle (e.g., stored in the "cargo space" on the rear seat (occupant surface on the seat base as the "cargo floor"), and thus capable of impacting front seats 110), and discussion of rear seats and cargo space at the rear end of the vehicle is not intended to be limiting.

Rear seats 120 typically include a seat bottom 122 connected to a seatback 124 to support an occupant in the vehicle 100. The seat bottom 122 may be removably secured to the vehicle floor. The seatback 124 may be pivotably mounted to the seat bottom 122, and include a rear side 128 facing the cargo space 130. The rear seats 120 may optionally include a head restraint 125. Each of the seatback 124 and seat bottom 122 include foam cushions conventionally secured to a seat frame (not shown) by any method generally known in the art. The cushion defines an occupant support side 126 on the front side, opposite the rear side 128, as shown, for example, in FIG. 10A. Each foam cushion may be one or more foam parts, joined together to form the seat component (e.g., seat bottom or seatback), such as, but not limited to side bolsters or other components used to meet a selected design. The foam cushions can have any suitable size and configuration, based on the selected design for the vehicle seating arrangement, and particular the rear seats 120. The foam material of the cushions may be any suitable comfort foam material that provides soft resilience during use, such as, but not limited to, a suitable resilient polymer (e.g., polyurethane foam, soy-based foam, silicone, thermoplastic olefins, thermoplastic urethanes, polymer fibers, nonwoven polyester pads, natural oil-based expanded polyurethanes, latex foams, and the like) and may be formed in any suitable manner. Rear seats 120 may also include a trim cover assembly 129 disposed over the foam cushions in a covering relationship. The trim cover 129 may be any trim material commonly known in the art, such as, but not limited to, cloth, leather, or polymers of sufficient quality and thickness for use in seat trim applications.

The rear seat 120 includes an energy absorbing feature 200 attached on the rear side 128 of seatback 124 to the frame 123 (not shown in FIG. 2) of seatback 124 and through the trim material 129, and stowed towards rear side 128 of the seatback 124. Although referred to hereinafter as an energy "absorbing" feature 200, the feature may absorb energy from cargo or deflect cargo from impacting the seatback, and reference to energy "absorbing" is thus intended to be inclusive of the deflection feature, and is not intended to be limiting. Furthermore, although shown as one energy absorbing feature 200 per seatback 124, any number of energy absorbing features may be included according to the seatback design, and the depiction of one feature for one seatback is not intended to be limiting (i.e., one energy absorbing feature may span across two or more seatbacks). The energy absorbing feature may be releasably attached by any suitable mechanism to enable movement of the energy absorbing feature 200 between the storage and deployed positions, as will be discussed in the various embodiments discussed herein. In certain embodiments, the energy absorbing feature 200 is moved via the mechanism by an actuator between the storage and deployed positions. The actuator may trigger motion of the energy absorbing feature via electromechanical actuation, including, but not limited to, in certain embodiments, yielding or damping. Although an arrangement of energy absorbing feature 200 is shown in FIG. 2, variations are contemplated as discussed herein, and the discussion of the energy absorbing feature 200 with reference to FIG. 2 is not intended to be limiting. Although energy absorbing feature 200 is shown in FIG. 2 in a storage position (i.e., stowed towards the rear side 128 of the seatback 124), deployment and interfacing of the energy absorbing feature 200 with cargo and/or the cargo floor will be discussed in further detail in the embodiments shown in FIGS. 4A-10A. The energy absorbing feature 200 includes a rigid member 210 connected to the rear side 128 at a pivot point 220 such that the rigid member is movable between the storage position and a deployed position. In one or more embodiments, in the storage position, the rigid member 210 is positioned adjacent the surface of the rear side 128 of the seatback 124. In the embodiment shown in FIG. 2, the rigid member 210, in the storage position, is connected at a connection region 212 of the rigid member 210 at the pivot point 220, with a free end 214 of the rigid member positioned vertically above the connection region 212 along and adjacent to the plane defined by the rear side 128, opposite the pivot point 220. Although the storage position of the embodiment of FIG. 2 is shown with the free end 214 vertically higher than the connection region 212, other suitable configurations for storing the rigid member are also contemplated, with certain embodiments being discussed in detail in FIGS. 4A-10A.

In one or more embodiments, the energy absorbing feature 200 is deployed when a crash event is predicted or occurs (e.g., a rear impact crash or front impact crash, or the corresponding rebound), or a sudden braking event occurs. Hereinafter, rear impact crash, front impact crash, rebound, and sudden braking event will be collectively referred to as a 'crash event' or interchangeably an 'impact event,' although crash/impact event may also refer to other crashes or impacts not explicitly provided herein. In the deployed position, the energy absorbing feature can absorb kinetic energy from the moving cargo, the rear seatback, or both, by the rigid member 210 contacting the moving cargo and/or the cargo floor 132. Similarly, the energy absorbing feature 200 deflects cargo from impacting the seatback by causing the cargo to interface with the rigid member 210. Thus, the energy absorbing feature 200 can reduce twisting and/or deformation of the seatback during the crash event (and particularly deflect cargo from impacting the seatback as caused by a rear impact), as well as prevent moving cargo from imparting energy directly to the seatback during the crash event.

Generally, the rigid member 210 is of sufficient strength (i.e., having a rigid or semi-rigid property) such that the rigid member 210 itself does not deform upon interfacing with the cargo and/or the cargo floor 132. Although the term rigid is used throughout, the term rigid includes semi-rigid for purposes of the embodiments disclosed herein, except where described for particular embodiments. The rigid member 210 may be a solid or hollow rod or tube, a panel, or other suitable member capable of interfacing with loose cargo and/or the cargo floor 132, and may be constructed of plastic, metal, or composite materials which are sufficiently pliable as not to fracture upon interfacing with the cargo and/or the cargo floor 132 while offering the interface with the cargo and/or cargo floor 132. The rigid member 210 is constructed of any suitable material to provide the rigid or semi-rigid strength, such as, but not limited to plastic, metal, or composite materials which exhibit sufficient flexural strength ($\sigma$) as to not plastically deform upon interfacing with the cargo and/or cargo floor 132. Flexural strength is defined as the stress in a material just before it yields in a flexure test, where a specimen is bent until fracture or yielding (i.e., plastic deformation). Materials have a flexural modulus which exhibits the property of resisting bending, which is related to the flexural strength. The flexural modulus is computed as the ratio of stress to strain in flexural deformation, and is determined from the slope of a stress-strain curve produced by a flexural test (such as the ASTM D790). For example, in some embodiments, the rigid member 210 has a flexural modulus of at least 1.5 GPa, in other embodiments at least 1.75 GPa, and in yet other embodiments at least 2.0 GPa. Furthermore, the modulus of elasticity (E) may be, in some embodiments, up to 250 GPa, in other embodiments, up to 200 GPa, and in yet other embodiments, up to 100 GPa. For example, certain polymers have the minimum flexural modulus as described herein. In further examples, materials such as carbon fiber (228 GPa), steel (200 GPa), and aluminum (69 GPa) are contemplated. Discussion of these examples is not intended to be limiting, as the material and design selection of the rigid member may be integrated into the overall design based on desired features. In certain embodiments, the rigid member 210 may be constructed of a material having a Shore A hardness of 40 to 100 in some embodiments, 60 to 95 in other embodiments, and 65 to 90 in yet other embodiments. In some embodiments, the rigid member 210 may be constructed of a material having a Shore D hardness of 0 to 75 in some embodiments, 5 to 70 in other embodiments, and 10 to 65 in yet other embodiments.

The rigid member 210 may have any suitable length and width based on the length and width of the seatback 124. The seatback 124 may be configured in a 40/60 configuration; a 40/20/40 configuration; or a 100% configuration, and as such the length and width of the rigid member 210 may vary. As such, in some embodiments, the rigid member 210 may have a width of 150 to 1200 mm, in other embodiments, 175 to 1175 mm, and in yet other embodiments 200 to 1150 mm. The length of the rigid member 210, as measured along the height of the seatback 124 may be 125 to 1000 mm in certain embodiments, 150 to 950 mm in other embodiments, and 175 to 925 mm in yet other embodiments. In certain embodiments, the seatback 124 may have a height, for example, of 500 to 650, with the length of the rigid member 210 corresponding accordingly, in some embodiments, with a length of 125 to 600 mm, in other embodiments, 150 to 550 mm, and in yet other embodiments, 175 to 500 mm. Although shown in FIG. 2 as a U-shaped bar, rigid member 210 may be any suitable shape or size to interface with the loose cargo and/or cargo floor. For example, in other embodiments, the rigid member 210 may be asymmetric such that portion 214 of the rigid member forms a triangle or trapezoid with the seatback and portion 214 (as shown in FIG. 3), as opposed to a square or rectangle as shown in FIG. 2. Thus, the rigid member 210 is positioned at an angle from farther (at the center of the vehicle) to closer to the seatback (towards the side of the vehicle) to deflect cargo and have it slide to the side of the vehicle upon impact with the rigid member 210. In certain embodiments, the rigid member 210 may be movable about the pivot point 220 to absorb kinetic energy from the cargo. The rigid member 210 may be biased in the deployed direction by any suitable mechanism, such as, but not limited to, a spring, which can absorb the kinetic energy from the cargo or act as an energy damper as the rigid member 210 moves upon contact with the cargo. In other embodiments, the rigid member 210 is moved mechanically by a mechanism, such as, but not limited to, a fillable bladder, a motor, a spring, pyrotechnics, or other suitable mechanism, which is moved via an actuator. Various embodiments of the energy absorbing feature 200 as deployed and during a crash event will now be discussed in detail.

Figure 4B:
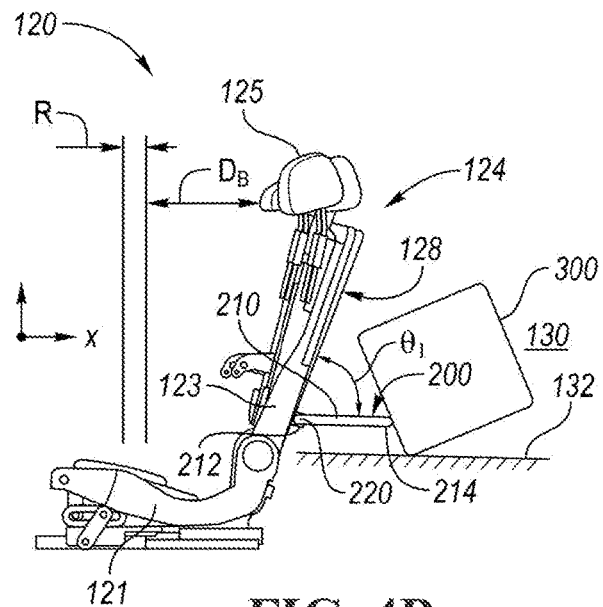

Referring to FIGS. 4A-B, the energy absorbing feature 200 according to the embodiment of FIG. 2 is shown in the deployed position (FIG. 4A) and during the crash event (FIG. 4B). The rear seat 120 includes bottom frame 121 forming seat bottom 122, and seatback frame 123 forming seatback 124. The rear side 128 of seatback 124 includes the energy absorbing feature 200 having connecting region 212 towards the bottom of the rear side 128, toward cargo floor 132, and the free end 214 above the connection region 212 (and adjacent the rear side 128) while in the storage position with respect to a height of the seatback 124. To move from the storage to the deployed position, free end 214 moves about pivot point 220 downward to the deployed position. The rigid member 210 may be moved from the storage to the deployed position by any suitable mechanism, such as, but not limited to, mechanical or electromechanical features (e.g., a mechanism which, upon impact or when it receives a signal of an impending impact, triggers a solenoid to unlock or release a stored energy device (such as a spring) which holds the rigid member 210 in the stored position), or via a bias (e.g., a spring loaded mechanism). In embodiments where the energy absorbing feature 200 is biased in the deployed position, a barrier may be released by an actuator to move the energy absorbing feature to the deployed position via the bias. In the deployed position, the free end 214 the rigid member 210 of the energy absorbing feature 200 extends away from the rear side 128 into cargo space 130. In the embodiment of FIG. 4A, the rigid member 210 is positioned at angle $\Theta_1$ with respect to the seatback 124. In some embodiments, $\Theta_1$ is a 35 to 90 degree angle, in other embodiments, a 50 to 80 degree angle, and in yet other embodiments 60 to 70 degree angle. In certain embodiments, $\Theta_1$ is such that the rigid member 210 is positioned substantially horizontally such that it is parallel with the cargo floor 132. As shown in FIG. 4B, cargo 300 is shown during a crash event. The cargo 300 interfaces with the rigid member 210 such that the cargo 300 transfers its kinetic energy to the rigid member 210. As such, the seatback 124 is protected from cargo 300, by slowing or preventing cargo 300 from hitting the seatback 124. Although the rigid member 210 is shown as fixed during the crash event upon contact with the cargo 300, in other embodiments, the connection region 212 may be configured with the pivot point 220 to absorb impact by movement of the rigid member 210 about the pivot point 220, changing $\Theta_1$, in some embodiments, by 1 to 65 degrees. As compared with the baseline maximum deflection $D_A$ of the seatback (shown in FIG. 1A) and in accordance with ECE requirements, the deflection distance $D_B$ of the seatback 124 as shown in FIG. 4B is larger, showing that the distance from the reference plane R is greater in the embodiment of FIG. 4B than that of $D_A$.

Figure 5A:
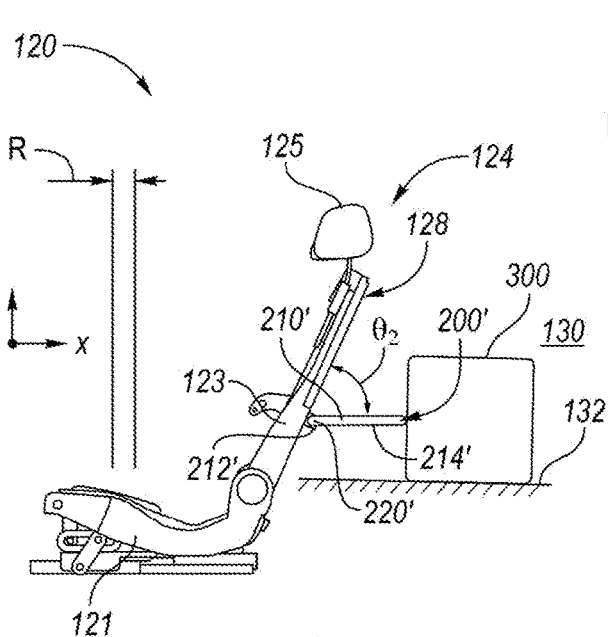
FIGS. 5A-B are schematic side views of a seatback with an energy absorbing feature according to another embodiment.
Figure 5B:
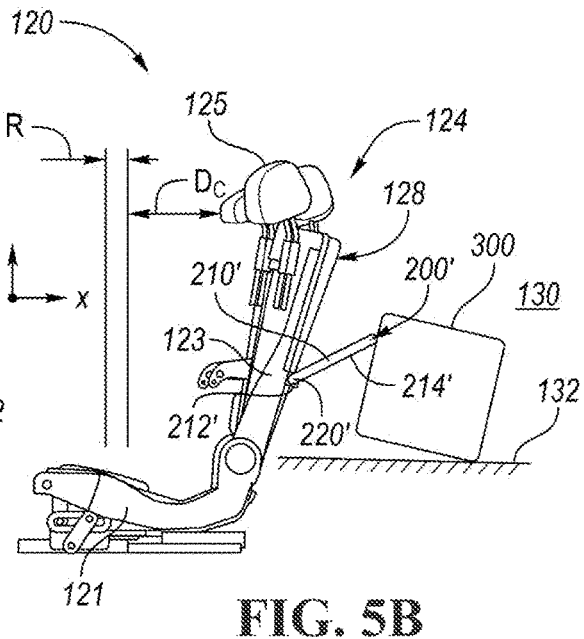

Referring to FIGS. 5A-B, the energy absorbing feature 200' according to another embodiment is shown in the deployed position (FIG. 5A) and during the crash event (FIG. 5B). The rear seat 120 includes bottom frame 121 forming seat bottom 122, and seatback frame 123 forming seatback 124. The rear side 128 of seatback 124 includes the energy absorbing feature 200' having connecting region 212' towards the center of the rear side 128. The position of the connection region 212' may vary as based on the center of gravity of the seatback 124, the center of the vertical height of the seatback 124, or as based on a vertical midpoint of the height of the cargo space 130. The storage position for energy absorbing feature 200' may include the free end 214' being positioned upward or downward from the connection region 212', as depending on the length of the rigid member 210'. To move from the storage to the deployed position, free end 214' moves about pivot point 220' (upward or downward) to the deployed position. The rigid member 210' may be moved from the storage to the deployed position by any suitable mechanism as previously discussed. In the deployed position, the free end 214' of the rigid member 210' of the energy absorbing feature 200' extends away from the rear side 128 into cargo space 130. In the embodiment of FIG. 5A, the rigid member 210' is positioned at angle $\Theta_2$ with respect to the seatback 124. In some embodiments, $\Theta_2$ is a 35 to 90 degree angle, in other embodiments, a 50 to 80 degree angle, and in yet other embodiments 60 to 70 degree angle. In certain embodiments, $\Theta_2$ is such that the rigid member 210 is positioned substantially horizontally such that it is parallel with the cargo floor 132. As shown in FIG. 5B, cargo 300 is shown during a crash event. The cargo 300 interfaces with the rigid member 210' such that the cargo 300 transfers its kinetic energy to the energy absorbing feature 200'. As shown in FIG. 5B, the connection region 212' is configured with the pivot point 220' to absorb impact by movement of the rigid member 210' about the pivot point 220' due to the force imparted by cargo 300, thus changing Θ₂, in some embodiments, by 1 to 65 degrees. In one or more embodiments, where the energy absorbing feature 200' is connected to the rear side 128 via a spring-loaded mechanism, the rigid member 210' may be biased in the deployed position such that the spring absorbs the energy upon impact from the cargo 300 as can be seen in the embodiment shown in FIG. 4B. In other embodiments, the rigid member 210' may be a one-way damper, which extends with minimal resistance, and dampens upon retraction via contact with the cargo 300. As such, the seatback 124 is protected from cargo 300, by slowing or preventing cargo 300 from hitting the seatback 124. As compared with the baseline maximum deflection $D_A$ of the seatback (shown in FIG. 1A) and in accordance with ECE requirements, the deflection distance Dc of the seatback 124 as shown in FIG. 5B is larger, showing that the distance from the reference plane R is greater in the embodiment of FIG. 5B than that of $D_A$.

Figure 6A:
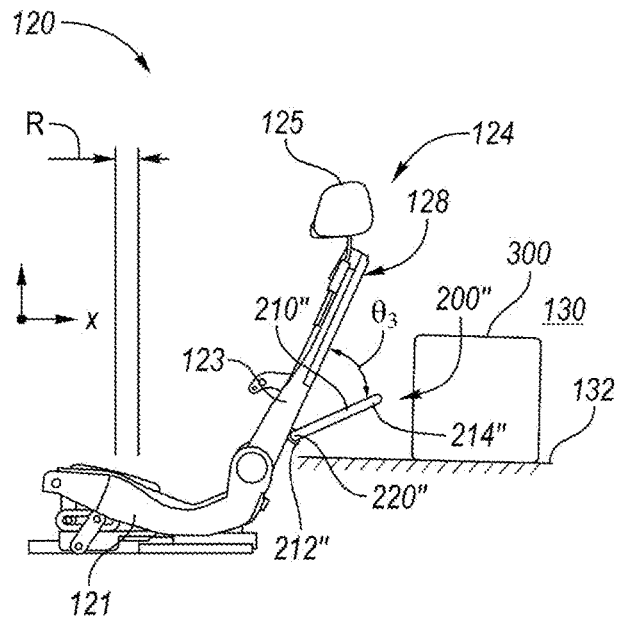
FIGS. 6A-B are schematic side views of a seatback with an energy absorbing feature according to yet another embodiment.
Figure 6B:
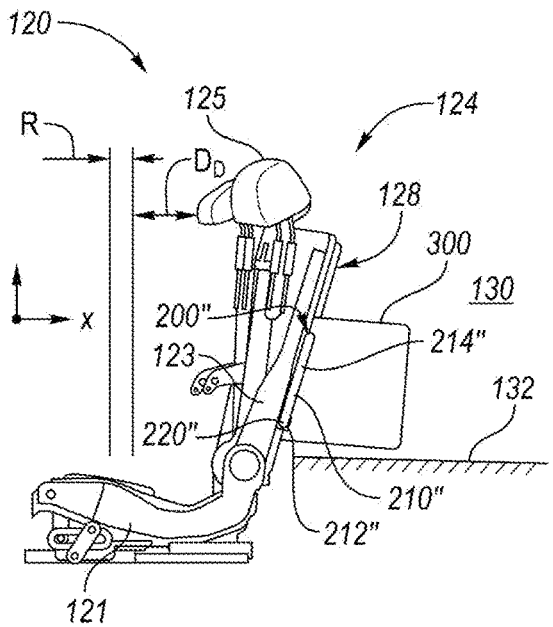

Referring to FIGS. 6A-B, the energy absorbing feature 200" according to another embodiment is shown in the deployed position (FIG. 6A) and during the crash event (FIG. 6B). The rear side 128 of seatback 124 includes the energy absorbing feature 200" having connecting region 212" towards the bottom of the rear side 128, as defined along the height of the seatback 124 and toward the cargo floor 132. The storage position for energy absorbing feature 200" may include the free end 214" being positioned upward from the connection region 212" and adjacent the surface of the rear side 128. To move from the storage to the deployed position, free end 214" moves downward about pivot point 220" to the deployed position. The rigid member 210" may be moved from the storage to the deployed position by any suitable mechanism as previously discussed. In the deployed position, the free end 214" of the rigid member 210" of the energy absorbing feature 200" extends away from the rear side 128 into cargo space 130. In the embodiment of FIG. 6A, the rigid member 210" is positioned at angle Θ₃ with respect to the seatback 124. In some embodiments, Θ₃ is a 35 to 90 degree angle, in other embodiments, a 50 to 85 degree angle, and in yet other embodiments 65 to 80 degree angle. In certain embodiments, Θ₃ is such that the rigid member 210 is positioned 5 to 45 degrees above a substantially horizontal plane as defined parallel to the cargo floor 132, in other embodiments 7 to 35 degrees above the substantially horizontal plane, and in yet other embodiments 10 to 25 degrees above the substantially horizontal plane. As shown in FIG. 6B, cargo 300 is shown during a crash event. The cargo 300 interfaces with the rigid member 210" such that the cargo 300 transfers its kinetic energy to the energy absorbing feature 200". As shown in FIG. 6B, the connection region 212" is configured with the pivot point 220" to absorb impact by movement of the rigid member 210" about the pivot point 220" due to the force imparted by cargo 300, thus changing Θ₃, in some embodiments, by 1 to 80 degrees. In an embodiment, as shown in FIG. 6B, upon impact, Θ₃ may approach zero. In one or more embodiments, where the energy absorbing feature 200" is connected to the rear side 128 via a spring-loaded mechanism, the rigid member 210" is biased in the deployed position such that the spring absorbs the energy upon impact from the cargo 300 as can be seen in the embodiment shown in FIG. 6B. As such, the seatback 124 is protected from cargo 300, by slowing or preventing cargo 300 from hitting the seatback 124. As compared with the baseline maximum deflection $D_A$ of the seatback (shown in FIG. 1A) and in accordance with ECE requirements, the deflection distance DD of the seatback 124 as shown in FIG. 6B is larger, showing that the distance from the reference plane R is greater in the embodiment of FIG. 6B than that of $D_A$.

Figure 7A:
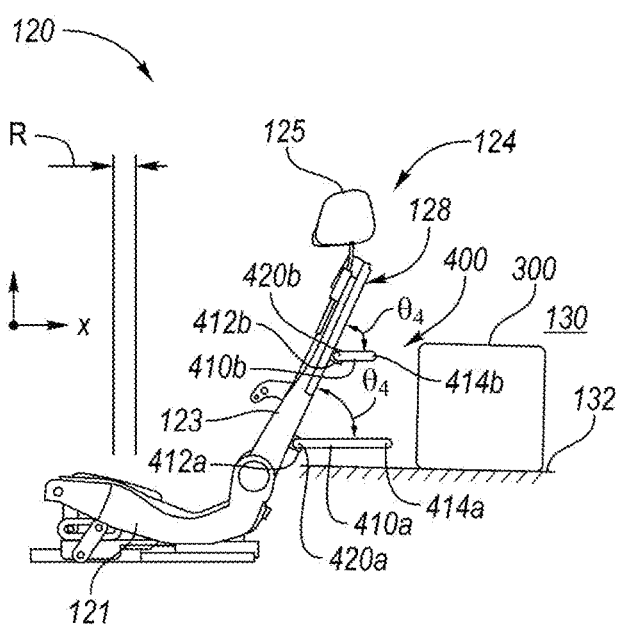
FIGS. 7A-B are schematic side views of a seatback with an energy absorbing feature according to yet another embodiment.
Figure 7B:
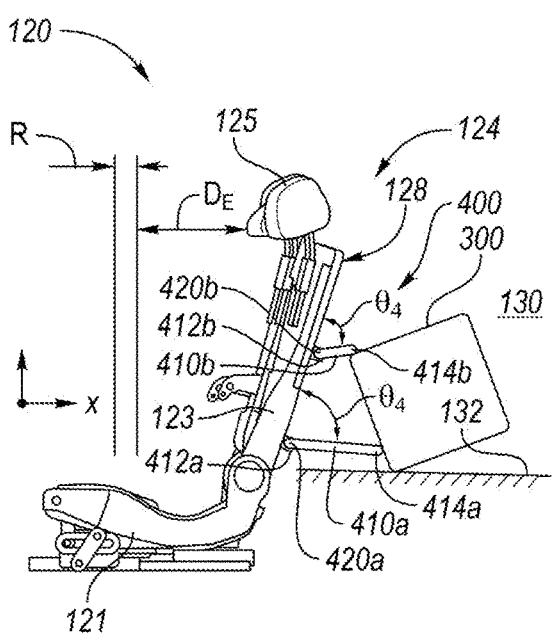

Referring to FIGS. 7A-B, the energy absorbing feature 400 according to yet another embodiment is shown in the deployed position (FIG. 7A) and during the crash event (FIG. 7B). The rear side 128 of seatback 124 includes the energy absorbing feature 400 including a first rigid member 410a having connecting region 412a towards the bottom of the rear side 128, toward cargo floor 132, and the free end 414a above the connection region 412a (and adjacent the rear side 128) while in the storage position with respect to a height of the seatback 124. To move from the storage to the deployed position, free end 414a of the rigid member 410a moves about pivot point 420a downward to the deployed position. The energy absorbing feature 400 of FIGS. 7A-B further includes a second rigid member 410b with connecting region 412b, in certain embodiments, towards the center of the rear side 128. The position of the connection region 412b may vary as based on the center of gravity of the seatback 124, the center of the vertical height of the seatback 124, or as based on a vertical midpoint of the height of the cargo space 130. In other embodiments, the rigid members 410a, 410b may be vertically closer together such that the cargo 300 does not slip under the rigid member 410b. The storage position for the second rigid member 410b may include free end 414b being positioned upward or downward from the connection region 412b, as depending on the length of the rigid member 410b. To move from the storage to the deployed position, free end 414b moves about pivot point 220b (upward or downward) to the deployed position. In certain embodiments, in the storage position, the rigid members 410a, 410b may be nested based on having different widths, or stored in any suitable manner adjacent the rear side 128 of seatback 124. The rigid members 410a, 410b may be moved from the storage to the deployed position by any suitable mechanism as previously discussed. In the deployed position, the free ends 414a, 414b of the rigid members 410a, 410b of the energy absorbing feature 400 extend away from the rear side 128 into cargo space 130. In the embodiment of FIG. 7A, both of the rigid members 410a, 410b are positioned substantially parallel to each other. In certain embodiments, each rigid member 410a, 410b is positioned at angle Θ₄ with respect to the seatback 124. In the embodiment shown in FIG. 7A, each rigid member 410a, 410b is positioned at the same degree angle, and in other embodiments (not shown), each rigid member 410a, 410b may be positioned at different degree angles. In some embodiments, Θ₄ is a 35 to 90 degree angle, in other embodiments, a 50 to 80 degree angle, and in yet other embodiments 60 to 70 degree angle. In certain embodiments, Θ₄ is such that the rigid members 410a, 410b are positioned substantially horizontally such that they are parallel with the cargo floor 132. Additionally, the rigid members 410a, 410b, in the deployed position, may be vertically spaced apart by any suitable distance based on the desired dimensions of the seatback or commonly expected cargo dimensions. In certain embodiments, the rigid members 410a, 410b are spaced apart along a vertical direction by at most 300 mm; in other embodiment 100 to 275 mm, and in yet other embodiments 200 to 250 mm. Furthermore, although rigid members 410a, 410b are shown as having a similar shape, the rigid members 410a, 410b may be any suitable combination of features such as panels, bars, rods, and the like, to interface with the cargo 300, and the depiction of similar rigid members 410a, 410b is not intended to be limiting.

As shown in FIG. 7B, cargo 300 is shown during a crash event. The cargo 300 interfaces with both the rigid members 410a, 410b such that the cargo 300 transfers its kinetic energy to the energy absorbing feature 400. Although the cargo 300 is shown as interfacing with both rigid members 410a, 410b, it should be understood that size and shape of cargo 300 may vary and as such, either one or both of the rigid members 410a, 410b may interface with the cargo 300. As shown in FIG. 7B, the connection region 412b is configured with the pivot point 420b to absorb impact by movement of the rigid member 410b about the pivot point 420b due to the force imparted by cargo 300. However, although rigid member 410a is shown as fixed and rigid member 410b is shown as pivoting during the crash event, it should be understood that one or both of the rigid members 410a, 410b may be fixed or may be able to pivot about the pivot point upon impact from the cargo 300, thus changing $\Theta_A$. In one or more embodiments, where the energy absorbing feature 400 is connected to the rear side 128 via a spring-loaded mechanism, at least one of the rigid members 410a, 410b may be biased in the deployed position such that the spring absorbs the energy upon impact from the cargo 300, as can be seen by movement of rigid member 410b shown in FIG. 7B. As such, the seatback 124 is protected from cargo 300, by slowing or preventing cargo 300 from hitting the seatback 124. As compared with the baseline maximum deflection $D_A$ of the seatback (shown in FIG. 1A) and in accordance with ECE requirements, the deflection distance DE of the seatback 124 as shown in FIG. 7B is larger, showing that the distance from the reference plane R is greater in the embodiment of FIG. 7B than that of $D_A$.

Figures 8A, 8B:
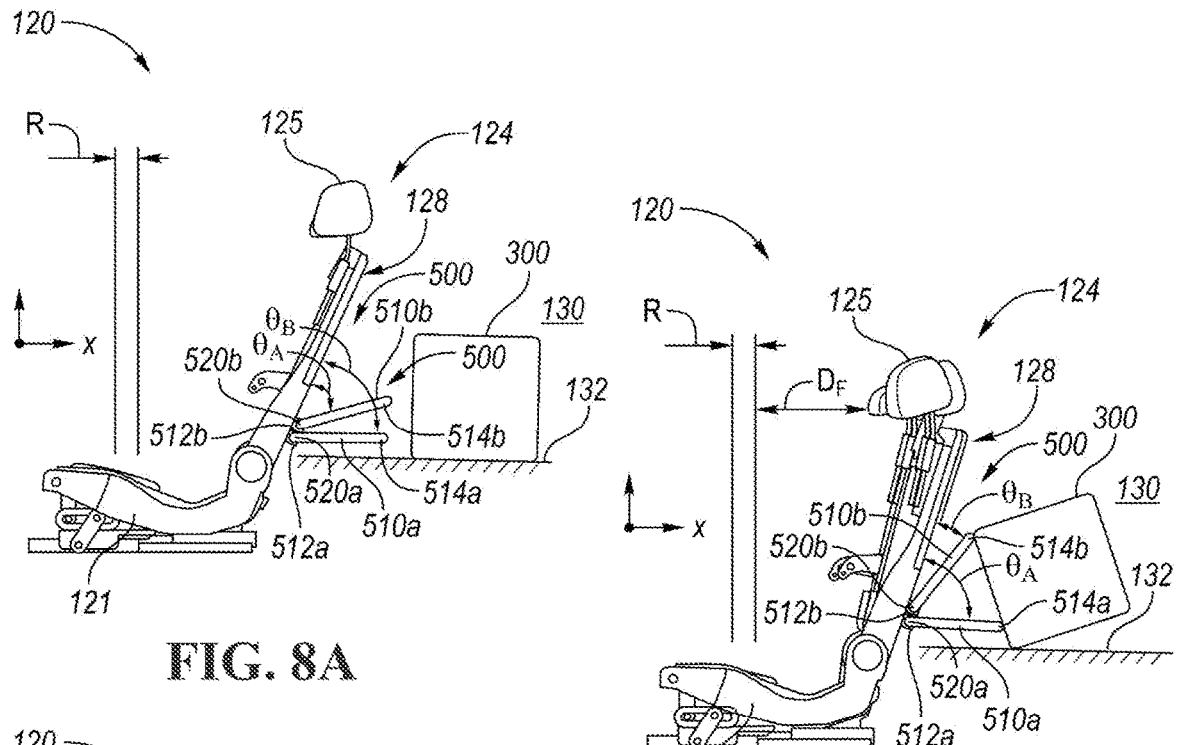
FIGS. 8A-B are schematic side views of a seatback with an energy absorbing feature according to yet another embodiment.

Referring to FIGS. 8A-B, the energy absorbing feature 500 according to yet another embodiment is shown in the deployed position (FIG. 8A) and during the crash event (FIG. 8B). The rear side 128 of seatback 124 includes the energy absorbing feature 500 including a first rigid member 510a having connecting region 512a towards the bottom of the rear side 128, toward cargo floor 132, and the free end 514a above the connection region 512a (and adjacent the rear side 128) while in the storage position with respect to a height of the seatback 124. To move from the storage to the deployed position, free end 514a of the rigid member 510a moves about pivot point 520 downward to the deployed position. The energy absorbing feature 500 of FIGS. 8A-B further includes a second rigid member 510b, with connecting region 512b at the same pivot point 520 as rigid member 510a. The storage position for the second rigid member 510b may also include free end 514b being positioned upward from the connection region 512b, and the rigid members 510a, 510b may nest against the rear side 124. To move from the storage to the deployed position, free end 514b moves about pivot point 520 downward to the deployed position. The rigid members 510a, 510b may be moved from the storage to the deployed position by any suitable mechanism as previously discussed. In the deployed position, the free ends 514a, 514b of the rigid members 510a, 510b of the energy absorbing feature 500 extend away from the rear side 128 into cargo space 130. In the embodiment of FIG. 8A, both of the rigid members 510a, 510b are positioned with connection regions 512a, 512b at pivot point 520, with each rigid member 510a, 510b positioned at a different angle $\Theta_A$ and $\Theta_B$. In certain embodiments, rigid member 510a is positioned at a 35 to 90 degree angle $\Theta_A$ with respect to the seatback 124, in other embodiments, a 50 to 80 degree angle, and in yet other embodiments 60 to 70 degree angle. In the embodiment shown in FIG. 8A-8B, rigid member 510a is at an angle $\Theta_A$ such that rigid member 510 is substantially horizontal such that it is parallel to the cargo floor 132. Rigid member 510b is positioned at an angle $\Theta_B$ with respect to the seatback 124, where $\Theta_B$ is less than $\Theta_A$. In certain embodiments, $\Theta_B$ is 5 to 40 degrees less than $\Theta_A$, in other embodiments 7 to 30 degrees less, and in yet other embodiments 10 to 25 degrees less than $\Theta_A$. Furthermore, although rigid members 510a, 510b are shown as having a similar shape, the rigid members 510a, 510b may be any suitable combination of features such as panels, bars, rods, and the like, to interface with the cargo 300, and the depiction of similar rigid members 510a, 510b is not intended to be limiting.

As shown in FIG. 8B, cargo 300 is shown during a crash event. The cargo 300 interfaces with both the rigid members 510a, 510b such that the cargo 300 transfers its kinetic energy to the energy absorbing feature 500. Although the cargo 300 is shown as interfacing with both rigid members 510a, 510b, it should be understood that size and shape of cargo 300 may vary and as such, either one or both of the rigid members 510a, 510b may interface with the cargo 300. As shown in FIG. 8B, at least one of the connection regions 512a, 512b are configured with the pivot point 520 to absorb impact by movement of the rigid member 510a, 510b about the pivot point 520 due to the force imparted by cargo 300. However, although rigid member 510a is shown as fixed and rigid member 510b is shown as pivoting during the crash event such that only $\Theta_B$ changes, it should be understood that either, both, or none of the rigid members 510a, 510b may be fixed or may be able to pivot upon impact from the cargo 300. In one or more embodiments, where the energy absorbing feature 500 is connected to the rear side 128 via a spring-loaded mechanism, at least one of the rigid members 510a, 510b may be biased in the deployed position such that the spring absorbs the energy upon impact from the cargo 300, as can be seen by movement of rigid member 510b shown in FIG. 8B. As such, the seatback 124 is protected from cargo 300, by slowing or preventing cargo 300 from hitting the seatback 124. As compared with the baseline maximum deflection $D_A$ of the seatback (shown in FIG. 1A) and in accordance with ECE requirements, the deflection distance $D_F$ of the seatback 124 as shown in FIG. 8B is larger, showing that the distance from the reference plane R is greater in the embodiment of FIG. 8B than that of $D_A$.

Figures 9A, 9B:
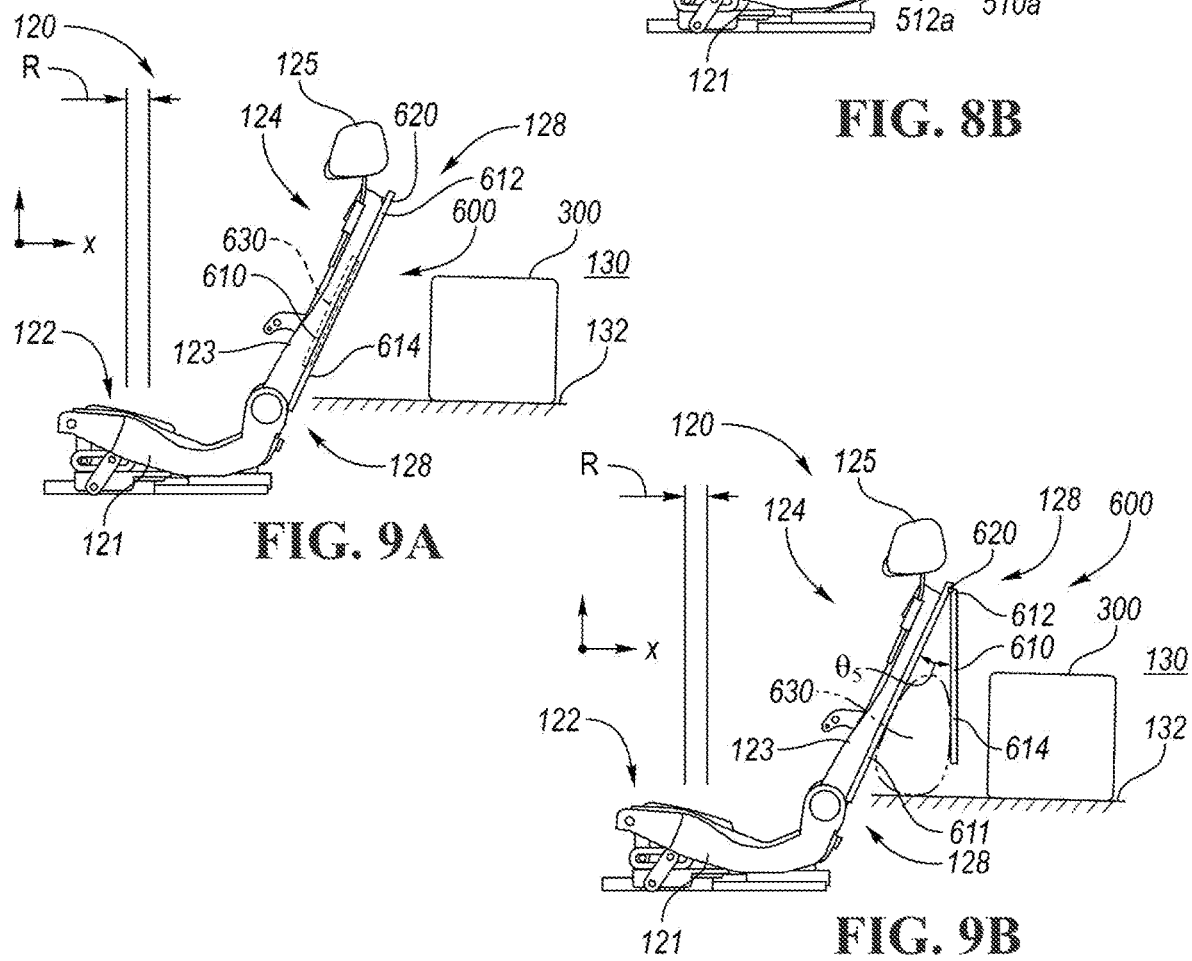
FIGS. 9A-C are schematic side views of a seatback with an energy absorbing feature according to yet another embodiment.
Figure 9C:
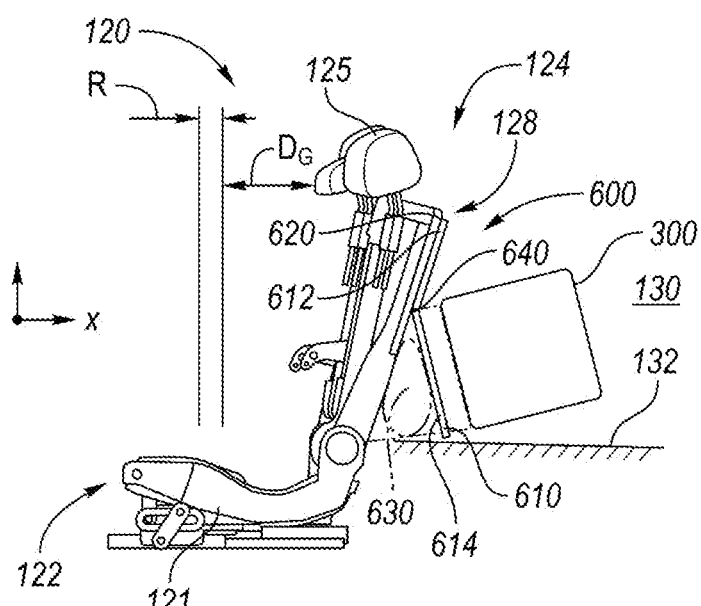

Referring to FIGS. 9A-C, an energy absorbing feature 600 is shown, according to yet another embodiment. Energy absorbing feature 600 includes a rigid member 610 shown as a panel. Although referred to as rigid, the rigid member 610 may be rigid or semi-rigid, however, rigid member 610 is of sufficient strength to interface with cargo 300 without cracking or breaking, but also, when semi-rigid material is used, the rigid member 610 may deform upon impact, but is of sufficient strength to return to its original shape (i.e., elastically deforms). Rigid member 610 may be made of any suitable material, such as, but not limited to, reinforced fabric (e.g., carpet or felt) or a polymer molded part as the semi-rigid material having sufficient flexural strength to elastically deform upon contact with the cargo and/or cargo floor 132. Rigid member 610 may have any suitable thickness for absorbing energy from the cargo 300, and in some embodiments has a thickness of 1 to 7 mm, in other embodiments, has a thickness of 2 to 6 mm, and in yet other embodiments, has a thickness of 3 to 5 mm. In one or more embodiments, the rigid member 610 has a thickness of less than 5 mm. Rigid member 610 is connected and hinged at pivot 620 at a top end of the rear side 128 of seatback 124, as defined along a height of the seatback 124. In certain embodiments, as shown in FIGS. 9A-C, the rigid member 610 may be connected to a surface panel 611 along the rear side 128 of the seatback 128, however it should be understood that the rigid member 610 may be directly connected to the seatback frame 124, as discussed in previous embodiments.

Energy absorbing feature 600 further includes a bladder 630 for moving the rigid member 610 between the storage position and the deployed position. In the storage position, as shown in FIG. 9A, the bladder 630 is empty and compressed, or may be vacuum sealed, between the rigid member 610 and the rear side 128 of seatback 124. Upon prediction of a crash event or the occurrence of a crash event (i.e., rear impact, front impact, rebound, or sudden braking), the bladder 630 is filled with fluid (e.g., air, water, or other suitable fluid), or the compressed medium expands, such that the bladder 630 pushes rigid member 610 into the cargo space 130, as shown in FIG. 9B. The fluid may be provided from an external source, such as the atmosphere, a container, or from another vehicle component. The bladder 630 may be connected to a valve (not shown) which is opened by an actuator to fill the bladder 630 to move the rigid member 610 to the deployed position. In certain embodiments, the valve opens to atmospheric pressure, permitting air to fill the bladder 630, as the compressed medium expands to its enlarged state. After the bladder 630 is filled with air, the valve may close to maintain the resistive force against cargo 300. In other embodiments, the bladder 630 may be filled by an expandable medium, such as, but not limited to, expandable foam, which expands when vented to atmospheric pressure by the valve. In one or more embodiments, the bladder 630 may include one or more orifices to act as a damper to dissipate energy imparted on the bladder 630. Furthermore, the bladder 630 may be a single use or a multi-use bladder. In embodiments where the bladder 630 is a multi-use bladder, the bladder 630 may be emptied by an on-board vacuum pump and recompressed between the rigid member 610 and the seatback 124 into the storage position. In a single use bladder embodiment, the bladder 630 may be sealed by a single use frangible member, similar to airbag deployment although less rapid.

In the deployed position, as shown in FIG. 9B, free end 614 of the rigid member 610 is extended into the cargo space 130, with connection region 612 being at the pivot 620. Bladder 630 is inflated, and positioned between the rear side 128 of the seatback 124 and the rigid member 610. Upon filling of the bladder 630 (as shown in FIG. 9B), the angle $\Theta_5$ between the surface panel 611 and the rigid member 610 in some embodiments, is 5 to 70 degrees, in other embodiments, is 10 to 60 degrees, and in yet other embodiments is 15 to 50 degrees.

As shown in FIG. 9C, energy absorbing feature 600 and cargo 300 is shown during a crash event. The cargo 300 interfaces with the rigid member 610 such that the cargo 300 transfers its kinetic energy to the energy absorbing feature 600. In certain embodiments, the rigid member 610 may deform around the body of bladder 630 at a location 640 on rigid member 610 corresponding to the top end of bladder 630 during the crash event due to impact by the cargo 300. Similarly, as shown in FIG. 9B, the connection region 612 may move about the pivot point 620 to absorb impact by movement of the rigid member 610 due to the force imparted by cargo 300, as well as because of compression of the bladder 630 via the impact against the rigid member 610. Thus, the bladder 630 may or may not deform on impact, depending on the resistive force therein. As such, the seatback 124 is protected from cargo 300, by slowing or preventing cargo 300 from hitting the seatback 124. As compared with the baseline maximum deflection $D_A$ of the seatback (shown in FIG. 1A) and in accordance with ECE requirements, the deflection distance $D_G$ of the seatback 124 as shown in FIG. 9C is larger, showing that the distance from the reference plane R is greater in the embodiment of FIG. 9C than that of $D_A$.

Figure 10A:
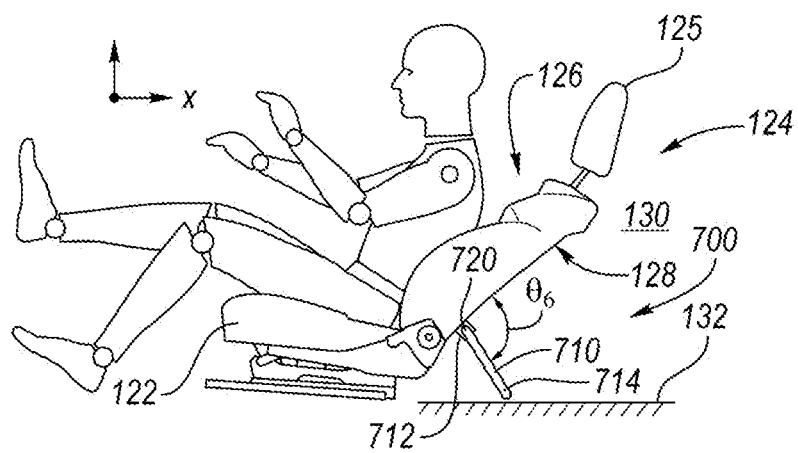
FIG. 10A is a schematic side view of a seatback with an energy absorbing feature according to another embodiment.
Figure 10B:
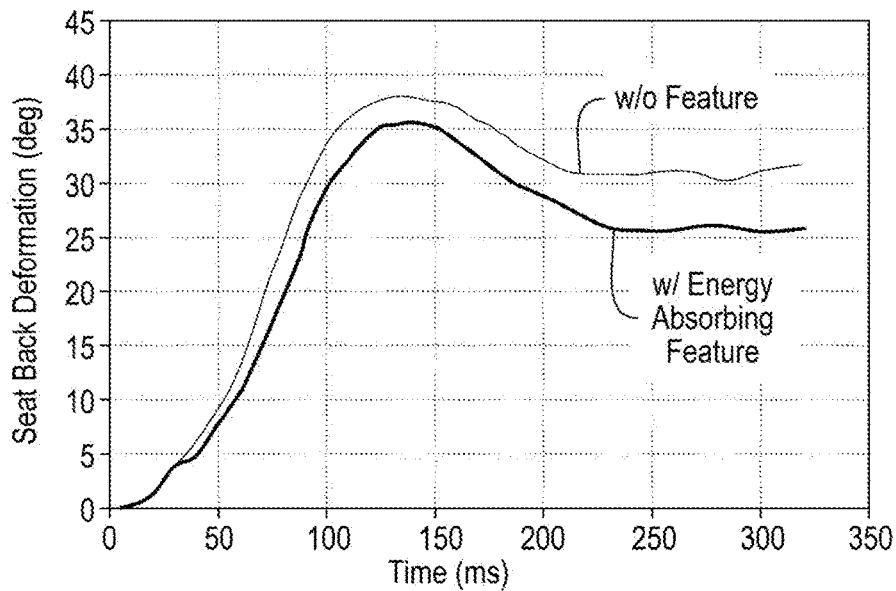
FIG. 10B is a graph showing the deflection comparison between a seatback including the energy absorbing feature of FIG. 10A, and the seatback without the energy absorbing feature of FIG. 1B.

In yet another embodiment, as shown in FIGS. 10A-B, an energy absorbing feature 700 may be positioned such that it reduces deflection of the seatback 124 during a crash event by reacting against the cargo floor 132. Energy absorbing feature 700 includes rigid member 710 positioned toward the bottom of the rear side 128 of the seatback 124 as defined along a height of the seatback 124, toward the cargo floor 132. Rigid member 710 may be stored (in the storage position) with a connecting region 712 at the pivot point 720, and a free end 714 located upward of the connecting region 712 along a surface of the rear side 128. Upon deployment (i.e., upon prediction or occurrence of a crash event), the free end 714 may move about the pivot 720 into the deployed position. The rigid member 710 may be moved from the storage to the deployed position by any suitable mechanism as previously discussed. In the embodiment shown in FIG. 10A, the rigid member 710 may be positioned at an angle $\Theta_6$ with respect to the seatback 124. In one or more embodiments, the rigid member 710 is perpendicular to the seatback 124. In certain embodiments, rigid member 710 is at a 70 to 110 degree angle $\Theta_6$ with respect to the seatback 124, in other embodiments, a 75 to 105 degree angle, and in yet other embodiments 80 to 100 degree angle. The free end 714 of rigid member 710, in the deployed position, may hover above cargo floor 132 prior to the crash event.

As shown in FIG. 10A, rear seat 120 is shown during a crash event. The cargo floor 132 interfaces with the rigid member 710 such that the rigid member 710 transfers its kinetic energy to the cargo floor 132. Thus, as seatback 124 moves about its connection point with seat bottom 122 (for example, due to the impact forces and/or occupant movement), the energy absorbing feature 700 limits the rearward movement of the seatback 124 into the cargo space 130. Although the energy absorbing feature 700 is shown contacting the cargo floor 132, it should be understood based on the other embodiments that the energy absorbing feature 700 may also interface with cargo in the vehicle, and slow or prevent the cargo from impacting the seatback 124. Similarly, although energy absorbing feature 700 is shown with a single rigid member 710, it should be understood that one or more rigid members may be included to interface with the cargo floor and/or the cargo to protect the seatback 124. In one or more embodiments, where the energy absorbing feature 700 is connected to the rear side 128 via a spring-loaded mechanism, the rigid member 710 may be biased in the deployed position such that the spring absorbs the energy upon impact against the cargo floor 132. As such, the seatback 124 deflection is limited by the energy absorbing feature 700 with the comparison of permanent deformation of the seatback with (FIG. 10A) and without (FIG. 1B) energy absorbing feature 700, as shown in the graph of FIG. 10B. FIG. 10B shows seatback deformation as determined from Finite Element Analysis measuring the rotation of the line connecting the recliner center & the highest point on the seat back side member.

Figure 11:
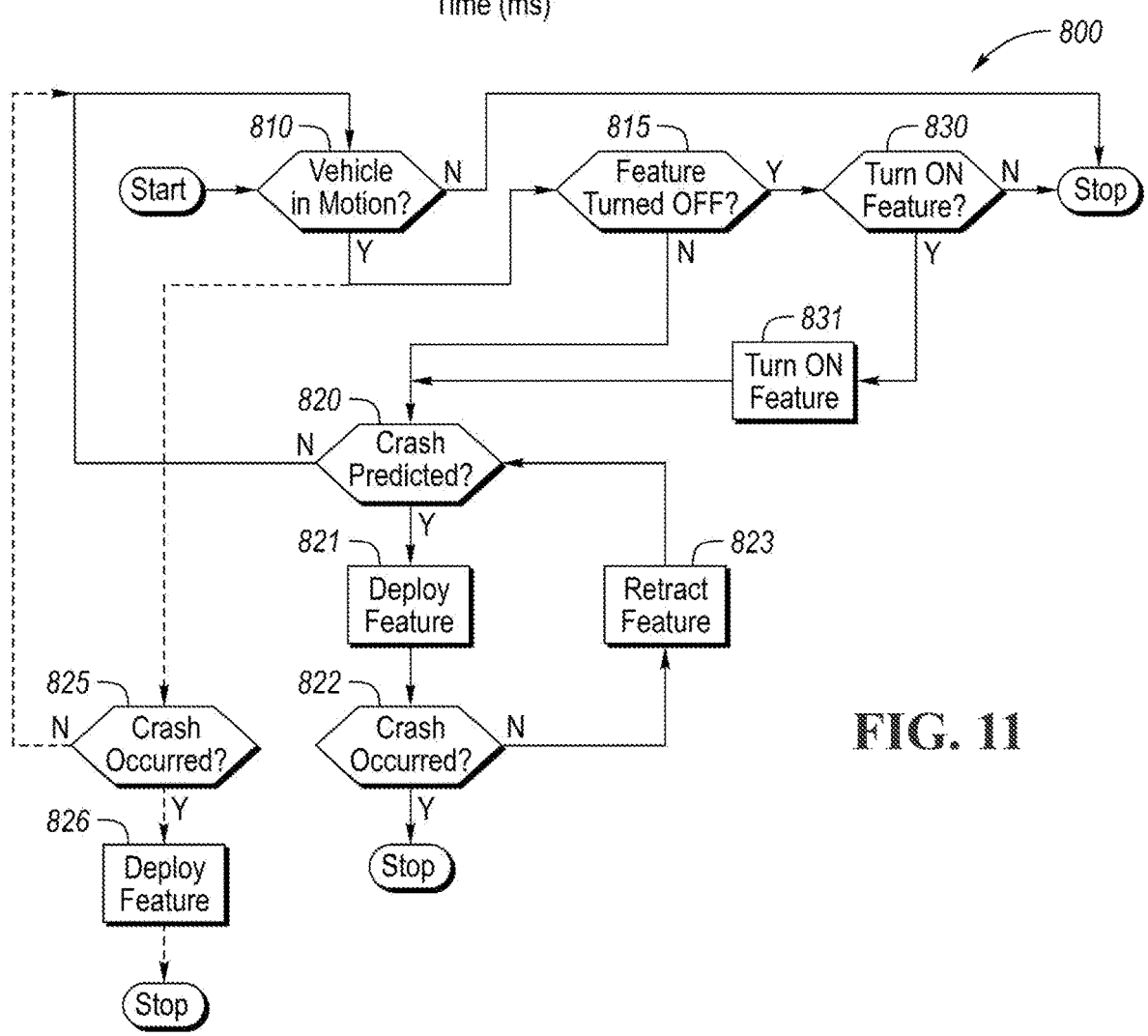
FIG. 11 is a flow chart for a method of protecting the rear seatback, according to an embodiment.

Referring to FIG. 11, a method 800 for protecting a seatback is provided. At block 810, a controller checks the vehicle is in motion. If not, the method does not proceed. If the vehicle is in motion, the system checks whether the energy absorbing feature is turned OFF at block 815. If the feature is ON, the method includes monitoring whether a crash event is predicted at block 820, or if a crash event occurred at block 825. Similarly, if the vehicle is in motion, the method may include monitoring whether a crash event has occurred at block 825, without checking if the feature is ON, such that the energy absorbing feature can be deployed at block 826 if necessary upon determination that a crash event has occurred or is detected. Furthermore, if the feature is ON, if a crash event is predicted or a crash event has occurred, the energy absorbing feature is deployed at blocks 821 and 826, respectively. In instances where the crash event is predicted and the energy absorbing feature is deployed, the method further includes determining whether the crash event occurred at block 822. If not, the energy absorbing feature is retracted at block 823, and the method further monitors whether a crash event is predicted at block 820, or occurs at block 825.

If the feature is OFF when the vehicle is in motion, the method includes prompting a vehicle occupant whether they would like to turn the energy absorbing feature ON at block 830. If so, the method includes turning on the energy absorbing feature at block 831, and monitoring whether a crash event is predicted at block 820. Thus, the energy absorbing feature can be deployed upon prediction or occurrence of a crash event (e.g., front impact, rear impact, or a sudden braking event).

According to one or more embodiments, an energy absorbing feature is provided for interfacing with loose cargo and/or the cargo floor in order to protect a seatback from deflecting upon a crash event and/or being impacted by the cargo during a crash event. Cargo hitting the seatback or deflection of the seatback during a crash event can be reduced by including the energy absorbing feature on the rear side of the seatback. The energy absorbing feature can be in a storage position when not in use, and a deployed position upon detection of a crash event (i.e., predicting a crash event or a crash event having occurred). Thus, upon deployment, the energy absorbing feature can absorb kinetic energy from loose cargo or transfer energy from a deflecting seatback to the cargo floor.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat comprising:
a seat bottom having an occupant support surface;
a seatback connected to the seat bottom, the seatback having an occupant support side cooperating with the occupant support surface, and a rear side; and
an energy absorbing feature including a rigid member connected to the rear side of the seatback and a bladder, the rigid member being movable between a storage position adjacent the seatback with the bladder compressed between a seatback frame and the rigid member, and a deployed position extending into a cargo space of a vehicle upon detection or occurrence of an impact event via the bladder being filled with a medium such that the rigid member is pushed to extend into the cargo space,
wherein, in the deployed position the bladder is contained between the seatback and the rigid member such that only the rigid member is capable of interfacing with cargo, a cargo floor, or both, to reduce force imparted on and deflection of the seatback and deflect cargo from impacting the seatback.

2. The seat of claim 1, wherein the rigid member is biased in the deployed position, and the rigid member is released from the storage position by an actuator upon the detection or occurrence of the impact event.

3. The seat of claim 1, wherein the rigid member is hinged toward a top end of the seatback, and includes a free end toward the cargo floor that is adjacent to the seatback in the storage position, and distanced from the seatback in the deployed position, with the bladder therebetween.

4. The seat of claim 1, wherein the medium is a fluid or air provided by an external source, and the bladder is vacuum sealed in the storage position such that upon the detection or occurrence of the impact event, a valve opens to fill the bladder with the medium.

5. The seat of claim 1, wherein the medium is an expandable foam stored in the bladder, and upon the detection or occurrence of the impact event, a valve opens to vent the expandable foam to atmospheric pressure such that the expandable foam enlarges the bladder.

6. The seat of claim 1, wherein the rigid member is connected to the seatback at a pivot point such that, in the deployed position, the rigid member can absorb kinetic energy from the cargo by pivoting about the pivot point.

7. The seat of claim 1, wherein, in the deployed position, a portion of the rigid member is positioned at an angle of 35 to 110 degrees from a plane defined along the rear side of the seatback.

8. The seat of claim 1, wherein the impact event is a crash event, a predicted crash event, or a sudden braking event.

9. A vehicle comprising:
a body having a front end and a rear end, and defining a cargo space having a cargo floor within the body of the vehicle;
a seat within the body forward of the cargo space, the seat including a seat bottom and a seatback connected to the seat bottom, the seatback having an occupant support side and a rear side exposed to the cargo space;
an energy absorbing feature connected to the rear side of the seatback, the energy absorbing feature having a rigid member being connected at a pivot and having a free region opposite the pivot, the rigid member being movable about the pivot between a storage position with the free region adjacent the rear side and a deployed position with the free region extending into the cargo space to interface with cargo, the cargo floor, or both, to protect the seatback; and
a controller configured to,
upon detection of whether an impact event is predicted, deploying the energy absorbing feature to the deployed position such that the energy absorbing feature inhibits cargo from contacting the seatback, and
upon determination that the impact event did not occur, retracting the energy absorbing feature to the storage position.

10. The vehicle of claim 9, wherein the rigid member is U-shaped.

11. The vehicle of claim 9, wherein the energy absorbing feature further includes a bladder compressed between a seatback frame and the rigid member when the rigid member is in the storage position, and, in the deployed position, the bladder is filled with a medium such that the rigid member is pushed to extend into the cargo space.

12. The vehicle of claim 11, wherein the rigid member is a panel.

13. The vehicle of claim 9, wherein, the rigid member has an asymmetric shape for deflecting the cargo from impacting the seatback.

14. The vehicle of claim 9, wherein the rigid member includes a plurality of rigid members connected to the rear side of the seatback.

15. The vehicle of claim 14, wherein, when in the deployed position, a first rigid member of the plurality of rigid members and a second rigid member of the plurality of rigid members are substantially parallel with the cargo floor, and the pivot of the first rigid member is spaced apart along a height of the rear side from the pivot of the second rigid member.

16. A method of protecting a seatback, the method comprising:
providing a seat having a seat bottom and seatback forward of a cargo space of a vehicle, the seatback having an occupant support side and a rear side exposed to the cargo space, the seat including an energy absorbing feature connected to the rear side of the seatback and pivotable from a storage position to a deployed position;
detecting whether a crash event is predicted;
upon prediction of the crash event, deploying the energy absorbing feature such that the energy absorbing feature inhibits cargo from contacting the seatback when the energy absorbing feature is in the deployed position;
determining whether the crash event occurred; and
upon determination that the crash event did not occur, retracting the energy absorbing feature to the storage position.

17. The method of claim 16, wherein, upon determination that the crash event occurred, deploying the energy absorbing feature such that cargo contacts the energy absorbing feature instead of the seatback.

18. The method of claim 16, wherein the energy absorbing feature includes a rigid member having a connection portion at the rear side and a free portion positioned adjacent the rear side of the seatback in the storage position, and positioned in the deployed position at a 35 to 110 degree angle with respect to a plane defined along the rear side of the seatback.

* * * * *